(12) United States Patent
Christian et al.

(10) Patent No.: US 11,404,043 B2
(45) Date of Patent: *Aug. 2, 2022

(54) SYSTEMS AND METHODS FOR PROVIDING NON-LEXICAL CUES IN SYNTHESIZED SPEECH

(71) Applicant: Intel Corporation, Santa Clara, CA (US)

(72) Inventors: Jessica M. Christian, Redwood City, CA (US); Peter Graff, San Jose, CA (US); Crystal A. Nakatsu, San Jose, CA (US); Beth Ann Hockey, Sunnyvale, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/851,457

(22) Filed: Apr. 17, 2020

(65) Prior Publication Data

US 2020/0243065 A1 Jul. 30, 2020

Related U.S. Application Data

(63) Continuation of application No. 16/037,872, filed on Jul. 17, 2018, now Pat. No. 10,679,606, which is a
(Continued)

(51) Int. Cl.
*G10L 13/027* (2013.01)
*G06F 40/30* (2020.01)
(Continued)

(52) U.S. Cl.
CPC ............ *G10L 13/027* (2013.01); *G06F 40/30* (2020.01); *G06F 40/40* (2020.01); *G10L 13/08* (2013.01); *G10L 2013/083* (2013.01)

(58) Field of Classification Search
CPC ........ G06F 40/30; G06F 30/40; G10L 13/027; G10L 13/08; G10L 2013/083
(Continued)

(56) References Cited

U.S. PATENT DOCUMENTS 6,226,614 B1 5/2001 Mizuno et al.
6,236,966 B1 5/2001 Fleming
(Continued)

FOREIGN PATENT DOCUMENTS

CN 1208910 2/1999
CN 1602483 3/2005
(Continued)

OTHER PUBLICATIONS

Allen, "Linguistic Aspects of Speech Synthesis," Proceedings of the National Academy of Science, vol. 92, Colloquium Paper, Oct. 1995, pp. 9946-9952.
(Continued)

*Primary Examiner* — Susan I McFadden
(74) *Attorney, Agent, or Firm* — Hanley, Flight and Zimmerman, LLC

(57) ABSTRACT

Systems and methods are disclosed for providing non-lexical cues in synthesized speech. An example system includes one or more storage devices including instructions and a processor to execute the instructions. The processor is to execute the instructions to: determine a user tone of the user input; generate a response to the user input based on the user tone; and identify a response tone associated with the user tone. The example system also includes a transmitter to communicate the response and the response tone over a network.

18 Claims, 3 Drawing Sheets

US 11,404,043 B2
Page 2

Related U.S. Application Data continuation of application No. 15/384,148, filed on Dec. 19, 2016, now Pat. No. 10,026,393, which is a continuation of application No. 14/497,994, filed on Sep. 26, 2014, now Pat. No. 9,542,929.

(51) Int. Cl.
*G06F 40/40* (2020.01)
*G10L 13/08* (2013.01)

(58) Field of Classification Search
USPC .......................................................... 704/260
See application file for complete search history.

(56) References Cited

U.S. PATENT DOCUMENTS

| | | | |
|---|---|---|---|
| 6,282,599 | B1 | 8/2001 | Gallick et al. |
| 7,617,188 | B2 | 11/2009 | Hu et al. |
| 7,685,140 | B2 | 3/2010 | Jackson |
| 7,689,617 | B2 | 3/2010 | Parikh |
| 8,935,151 | B1 | 1/2015 | Petrov et al. |
| 8,972,259 | B2 | 3/2015 | Tepperman et al. |
| 9,223,537 | B2 * | 12/2015 | Brown ................. G06F 3/165 |
| 9,223,547 | B1 | 12/2015 | Endresen et al. |
| 9,305,544 | B1 | 4/2016 | Petrov et al. |
| 9,524,650 | B2 * | 12/2016 | Yavari ................. G09B 5/04 |
| 9,542,929 | B2 * | 1/2017 | Christian ............. G10L 13/08 |
| 9,721,573 | B2 | 8/2017 | Fritsch et al. |
| 9,767,788 | B2 | 9/2017 | Li |
| 10,026,393 | B2 * | 7/2018 | Christian ............. G10L 13/027 |
| 10,445,668 | B2 | 10/2019 | Oehrle et al. |
| 10,679,606 | B2 * | 6/2020 | Christian ............. G06F 40/30 |
| 2006/0217966 | A1 | 9/2006 | Hu et al. |
| 2007/0094030 | A1 | 4/2007 | Xu |
| 2012/0065977 | A1 | 3/2012 | Tepperman et al. |
| 2012/0084248 | A1 | 4/2012 | Gavrilescu |
| 2013/0006952 | A1 | 1/2013 | Wong et al. |
| 2013/0282688 | A1 | 10/2013 | Wong et al. |
| 2013/0289998 | A1 | 10/2013 | Eller et al. |
| 2015/0371626 | A1 | 12/2015 | Li |
| 2017/0256252 | A1 | 9/2017 | Christian et al. |
| 2018/0227417 | A1 | 8/2018 | Segalis et al. |
| 2019/0115007 | A1 | 4/2019 | Christian et al. |
| 2020/0243064 | A1 | 7/2020 | Christian et al. |

FOREIGN PATENT DOCUMENTS

| | | |
|---|---|---|
| CN | 1604183 | 4/2005 |
| CN | 1945693 | 4/2007 |
| CN | 101000764 | 7/2007 |
| CN | 101000765 | 7/2007 |
| CN | 101504643 | 8/2009 |
| CN | 102368256 | 3/2012 |
| CN | 103366731 | 10/2013 |
| CN | 103620605 | 3/2014 |
| CN | 104021784 | 9/2014 |
| EP | 1363200 | 11/2003 |

OTHER PUBLICATIONS

Sprout, "Multilingual Text Analysis for Text-to-Speech Synthesis," IEEE, vol. 3, Oct. 3, 1996, pp. 1365-1368.

United States Patent and Trademark Office, "Non-final Office Action," issued in connection with U.S. Appl. No. 14/497,994, dated May 5, 2016, 5 pages.

United States Patent and Trademark Office, "Notice of Allowance," issued in connection with U.S. Appl. No. 14/497,994, dated Sep. 19, 2016, 7 pages.

Arnold et al., "Disfluencies Signal Theee, Um, New Information," Journal of Psycholinguistic Research, vol. 32, No. 1, Jan. 2003, pp. 25-36.

International Searching Authority, "International Search Report and Written Opinion," issued in connection with International Patent Application No. PCT/US2015/047534, dated Oct. 30, 2015, 11 pages.

Shriver et al., "Audio Signals in Speech Interfaces," Language Technologies Institute, Carnegie Mellon University, 2000, 7 pages.

Tang et al., "Humanoid Audio-Visual Avatar with Emotive Text-to-Speech Synthesis," IEEE Transactions on Multimedia, vol. 10, No. 6, Oct. 6, 2008, pp. 969-981.

United States Patent and Trademark Office, "Non-final Office Action," issued in connection with U.S. Appl. No. 15/384,148, dated Oct. 18, 2017, 7 pages.

United States Patent and Trademark Office, "Notice of Allowance," issued in connection with U.S. Appl. No. 15/384,148, dated Mar. 27, 2018, 5 pages.

European Patent Office, "Extended European Search Report," issued in connection with European Patent application No. 15844926.4, dated Apr. 30, 2018, 7 pages.

United States Patent and Trademark Office, "Non-Final Office action," issued in connection with U.S. Appl. No. 16/037,872, dated Aug. 12, 2019, 13 pages.

United States Patent and Trademark Office, "Notice of Allowance," issued in connection with U.S. Appl. No. 16/037,872, dated Feb. 3, 2020, 12 pages.

Chinese Patent Office,"First Office Action," issued in connection with Chinese patent application No. 201580045620.x, dated Mar. 26, 2020, 39 pages.

Chinese Patent Office,"Second Office action and Search report," issued in connection with Chinese patent application No. 201580045620. X., dated Sep. 10, 2020, 8 pages.

Nick Campbell, "Specifying Affect and Emotion for Expressive Speech Synthesis," Lecture Notes in Computer Science, 2004, pp. 395-406,vol. 2945, ATR Human Information Science Laboratories, Kyoto, Japan.

European Patent Office, "Examination Report," issued in connection with Patent Application No. 15 844 926.4-1231, dated Apr. 5, 2021, 9 pages.

Jonathan Allen, "Linguistic aspects of speech synthesis," Human-Machine Communication by Voice, Feb. 8-9, 1993, 7 pages, Research Laboratory of Electronics, Massachusetts Institute of Technology, Cambridge, MA., United States of America.

Shive Sundaram and Shrikanth Narayanan, "An Empirical Text Transformation Method for Spontaneous Speech Synthesizers," Eurospeech, 2003, 4 pages, Department of Electrical Engineering—Systems and Integrated Media Systems Center, University of Southern California, Los Angelos, CA, United States of America.

Chinese Patent Office,"Notification to Grant Patent right for Invention," issued in connection with Chinese patent application No. 201580045620.x, dated Dec. 25, 2020, 7 pages.

Iwata et al., "Speaker's intentions conveyed to listeners by sentence-final particles and their intonations in Japanese conversational speech," retrieved from https://waseda.pure.elsevier.com/en/publications/speakers-intentions-conveyed-to-listeners-by-sentence-final-parti, on Feb. 24, 2021,4 pages. Abstract only.

United States Patent and Trademark Office "Notice of Allowance" dated May 18, 2022, issued in related U.S. Appl. No. 16/851,444, 9 pages.

Patent Cooperation Treaty "International Preliminary Report on Patentability" dated Mar. 28, 2017, issued in International Application No. PCT/US2015/047534, 7 pages.

United States Patent and Trademark Office "Non-Final Office Action" dated Oct. 14, 2021, issued in related U.S. Appl. No. 16/851,444, 14 pages.

United States Patent and Trademark Office "Notice of Allowance" dated Mar. 2, 2022, issued in related U.S. Appl. No. 16/851,444, 8 pages.

\* cited by examiner

SYSTEMS AND METHODS FOR PROVIDING NON-LEXICAL CUES IN SYNTHESIZED SPEECH

CROSS-REFERENCE TO RELATED APPLICATIONS

This patent arises from a continuation of U.S. patent application Ser. No. 16/037,872, titled "SYSTEMS AND METHODS FOR PROVIDING NON-LEXICAL CUES IN SYNTHESIZED SPEECH," filed Jul. 17, 2018, which is a continuation of U.S. patent application Ser. No. 15/384,148, titled "SYSTEMS AND METHODS FOR PROVIDING NON-LEXICAL CUES IN SYNTHESIZED SPEECH," filed Dec. 19, 2016, which is a continuation of U.S. patent application Ser. No. 14/497,994, titled "SYSTEMS AND METHODS FOR PROVIDING NON-LEXICAL CUES IN SYNTHESIZED SPEECH," filed Sep. 26, 2014. Priority is claimed to U.S. patent application Ser. Nos. 16/037,872; 15/384,148; and Ser. No. 14/497,994. U.S. patent application Ser. Nos. 16/037,872; 15/384,148; and 14/497,994 are hereby incorporated by reference herein in their entireties.

TECHNICAL FIELD

Embodiments herein relate generally to speech synthesis, and more particularly relate to providing non-lexical cues in text-to-speech output.

BACKGROUND

Natural language interfaces are becoming commonplace in computing devices generally, and particularly in mobile computing devices, such as smartphones, tablets, and laptop computers. Current natural language interfaces often synthesize speech that sounds artificial because the synthesized speech does not include non-lexical expressive features of natural language.

DETAILED DESCRIPTION

Natural language interfaces are presently available on a variety of computing devices generally, and particularly in mobile computing devices, such as smartphones, tablets, and laptop computers. These natural language interfaces presently provide output speech that is primarily, or even purely, lexical (i.e., of or relating to words or vocabulary of a language) and that often sounds mechanical and/or artificial. One reason for the mechanical and/or artificial sound of synthesized speech output by presently available natural language interfaces is that the synthesized speech does not incorporate non-lexical expressive features that are generally common in the speech of humans. Non-lexical cues include any noises or supra-lexical features such as prosody or pitch that can be inserted or altered in otherwise lexical speech. Commonly omitted non-lexical features include, but are not limited to, non-verbal disfluencies (e.g., um, oh, uh), phrasal stress ("No, not a rat. I saw a CAT come through the window."), intonation, lengthening (e.g., "that is waaaay too long"), breathing noises (e.g., sighs), phonological gestures (e.g., pfff, tsss), and the like.

The present inventors have recognized that incorporating non-lexical cues into a text-to-speech (TTS) system can make its output sound more like a live human being. Further, incorporating non-lexical cues can infuse added meaning to the output and improve the ability of a hearer to comprehend the output. Incorporating non-lexical cues can convey intended meaning that may not be conveyed otherwise.

The disclosed embodiments incorporate non-lexical cues into TTS technology to make synthesized speech output sound more like a live human being. The disclosed embodiments include systems and methods that can determine, using algorithmic technology, where in the output signal of a TTS system which non-lexical cues should occur.

Figure 1:
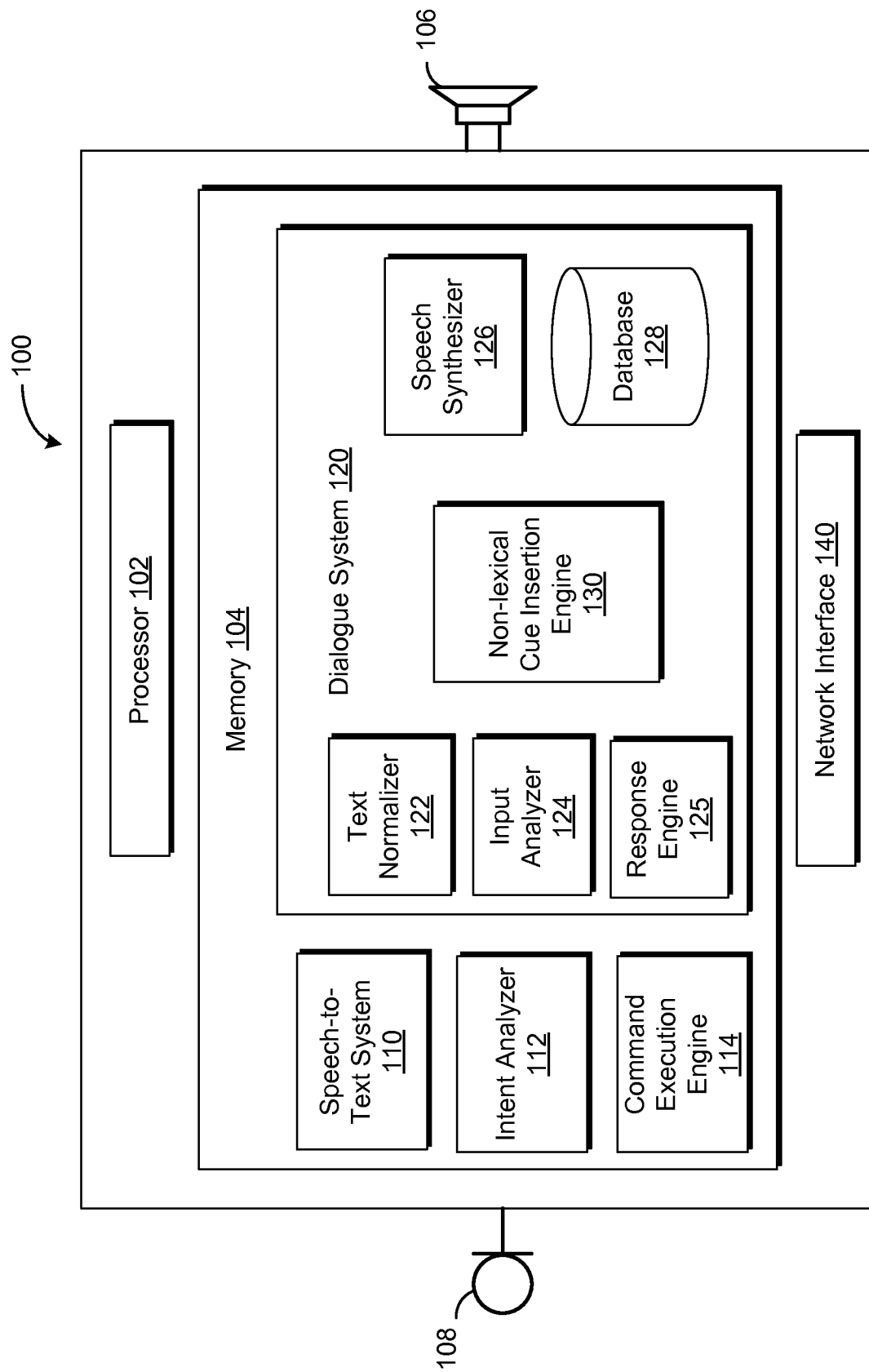
FIG. 1 is a schematic diagram of a system for providing non-lexical cues in text-to-speech output, according to one embodiment.

FIG. 1 is a schematic diagram of a system 100 for providing non-lexical cues in TTS output, according to one embodiment. The system 100 may include a processor 102, memory 104, an audio output 106, an input device 108, and a network interface 140. The processor 102 may be dedicated to the system 100 or may be incorporated into and/or borrowed from another system (e.g., a natural language interface) or computing device, such as a desktop computer or a mobile computing device (e.g., laptop, tablet, smartphone, or the like). The memory 104 may be coupled to or otherwise accessible by the processor 102. The memory 104 may include and/or store protocols, modules, tools, data, etc. The audio output 106 may be a speaker or an output port to transmit a signal including audio output to another system. The input device 108 may be a microphone, as illustrated. In other embodiments, the input device 108 may be a keyboard or other input peripheral (e.g., mouse, scanner). In still other embodiments, the input device 108 may simply be an input port configured to receive an input signal transmitting text. The input device 108 may include or couple to the network interface 140 to receive text data from a computer network.

The system 100 may include a speech-to-text system 110 (e.g., an automatic speech recognition (ASR) system) to receive an input audio waveform and convert the audio wave form of input speech to input text. This input text may be processed by the system 100 and/or another system to process commands and/or perform operations based on the speech-to-text output (i.e., the input text).

The system 100 may also include an intent analyzer 112 configured to use machine learning technology to identify and learn patterns of behavior, speech, interactions, and the like, which can be used to derive a user input intent, such as an intended meaning of input speech. Intent may include any meaning conveyed that is in addition to (or not included in) the words stated. The derived user input intent may be an intended meaning of user input (a message that the user wants to convey).

For example, the user input (e.g., input speech, input text) may be "Man, it's cold in here," to politely request that the system turn down the A/C. Input speech would be converted to text. The actual user input text is "Man, it's cold in here" and the intent may be "POLITE: Turn down the A/C." The intent could also be determined to be "SARCASTIC: Turn down the A/C." The intent can be inferred from the user input based on patterns of behavior, speech, interactions, and the like.

The user input intent may be represented as a textual intent phrase or sentence. In other embodiments, the derived user input intent may be represented as an input intent code. The user input intent may be provided with input text, for example to a dialogue system 120 and may be used in determining output speech, and specifically, in determining non-lexical cues to be included in synthesized output speech. In some instances, the user input intent may be stored in a user profile, for example in a database.

The system 100 may also include a command execution engine 114 configured to execute commands based on the user input (e.g., input speech, input text). The command execution engine 114 may, for example, launch another application (e.g., an email client, a map application, an SMS text client, a browser, etc.), interact with other systems and/or system components, query a network (e.g., the Internet) via a network interface 140, and the like.

The network interface 140 may couple the system 100 to a computer network, such as the Internet. In one embodiment, the network interface 140 may be a dedicated network interface card. The network interface 140 may be dedicated to the system 100 or may be incorporated into and/or borrowed from another system (e.g., a natural language interface) or computing device, such as a desktop computer or a mobile computing device (e.g., laptop, tablet, smartphone, or the like).

The system 100 may include a dialogue system 120 to generate an audible response to the user input (e.g., input speech, input text). The dialogue system 120 may also include one or more of the foregoing described components, including but not limited to the speech-to-text system 110, the intent analyzer 112, the command execution engine 114, and the like. In the illustrated embodiment of FIG. 1, the user adaptive dialogue system 120 may include a text normalizer 122, an input analyzer 124, a response engine 125, a non-lexical cue insertion engine 130, a speech synthesizer 126, and/or a database 128.

The dialogue system 120 provides a natural language interface (NLI) that generates output speech that includes non-lexical cues to sound more like a live human being and/or to provide added meaning. The dialogue system 120 may determine an appropriate response to the user input, including appropriate output speech in the form of original text. The appropriate output speech may be determined based on the user input, the user input intent, a user profile, and/or a device profile. The dialogue system 120 may determine an intent (e.g., meaning to be conveyed that is in addition to (or not included in) the words stated) of the output speech. The dialogue system 120 may determine non-lexical cues and insertion points for such to augment or enhance the output speech to convey the intent. In other words, the dialogue system 120 may augment the output speech original text with non-lexical cues that can be synthesized into output speech. Where a user input intent is not included with actual input text received at the dialogue system 120, the dialogue system 120 may derive an initial intent, for example, associated with a device, with a given user of the device, and/or with a given user profile of a user of the device.

The system 100, and particularly the dialogue system 120, may include a text normalizer 122, which may be configured to normalize or otherwise pre-process text. For example, the system 100 may receive raw text that may include symbols or other non-word components (e.g., numbers, punctuation, abbreviations, and the like). The text normalizer 122 may pre-process this raw text to convert symbols to written-out words and otherwise handle the symbols.

The system 100, and particularly the dialogue system 120, may include an input analyzer 124 to analyze input text received by dialogue system 120. The input text may be raw text or may be raw text that has been normalized. The input analyzer 124 may identify characteristics and/or features of the input text. The identified characteristics and/or features may be used to derive or augment a user input intent. In some embodiments, the intent analyzer 112 is integrated with the input analyzer 124. In some embodiments, the input analyzer 124 may determine an appropriate response to the user input. In some embodiments, the command execution engine 114 may be integrated with the input analyzer 124.

The system 100, and particularly the dialogue system 120, may include a response engine 125 to analyze the input text received by the dialogue system 120 and generate a response. The response engine 125 may derive meaning from the input text and the intent, if any, that may be included with the input text, and determine appropriate response text (e.g., original response text or simply original text). The response text can be considered original text that could be synthesized to output speech. More particularly, the response text represents a response that may be augmented with non-lexical cues to augmented text that is synthesized to output speech. The response engine 125 may select the response text from a plurality of potential responses, based on the user input and the user input intent received by the dialogue system 120. In some instances, the user input intent may not be provided to the dialogue system with the input text, in which case the user input intent may be derived, for example, by the input analyzer 124, from the characteristics and/or features identified by the input analyzer 124, and/or by the response engine 125. In some embodiments, the intent analyzer 112 is integrated with the response engine 125. In some embodiments, the command execution engine 114 may be integrated with the response engine 125.

The system 100, and particularly the dialogue system 120, may include a non-lexical cue insertion engine 130. The non-lexical cue insertion engine 130 may receive original text (e.g., response text) and determine an intent of the original text. The non-lexical cue insertion engine 130 may use the intent to determine insertion points of non-lexical cues and/or may determine which non-lexical cue to insert at the insertion point within the original text to generate augmented text that helps convey the intent of the original text. In other words, the intent may enable the non-lexical insertion engine 130 to identify words and/or word portions to augment with parasitic non-lexical cues and/or to identify positions between words to insert word-like non-lexical cues.

As an example, consider an intent that includes uncertainty (i.e., an intended meaning of the original text that is not communicated by the words alone may include uncertainty) or a low confidence level. The intent that includes uncertainty can be used in identifying insertion points for non-lexical cues. The phrase "fluffy bowling ball" in the original text may be accompanied by an intent that includes uncertainty (e.g., does "bowling ball" really follow "fluffy"?). The text analyzer 124 may determine to insert a non-lexical cue that conveys the uncertainty (or low confidence). Accordingly, the original text sequence "this is a fluffy bowling ball" may be augmented with one or more non-lexical cues, such as "this is a fluffy UM bowLING baLL." The disfluency "UM" and a rising intonation at the end of "bowling" and "ball" in the augmented text may convey uncertainty. When these non-lexical cues are synthesized into the output speech, they convey additional meaning that can assist a hearer in comprehending the synthesized speech. The non-lexical cues when synthesized into the output speech can convey the intent, namely uncertainty.

As illustrated by the foregoing example, a non-lexical cue may be word-like because it is inserted in a manner that is distinct from already present lexical components of the original text. An example of a word-like non-lexical cue may be a non-verbal disfluency, such as "um," "oh," "uh," or the like. As another example, a word-like non-lexical cue may be a breathing noise, such as a sigh. As still another example, a word-like non-lexical cue may be a phonological gesture, such as "pfff," "tsss," or the like.

Other non-lexical cues may be parasitic on at least a portion of a word within the original text. In the foregoing example, the rising intonation at the end of "bowling" and "ball" in "this is a fluffy UM bowLING baLL" are parasitic non-lexical cues (i.e., parasitic on portions of "bowling" and "ball"). As another example, a parasitic non-lexical cue may be a phrasal stress, such as a stress on the word "cat" in the following text string: "No, not a rat. I saw a CAT come through the window." As another example, a parasitic non-lexical cue may be an intonation, such as "John is French!" as compared to "John is French?" As still another example, a parasitic non-lexical cue may be lengthening a word, such as in the phrase, "that is waaaay too long."

To aid the non-lexical cue insertion engine 130 in determining the intent, the insertion points, and the non-lexical cues, the user input intent may be communicated with the user input text. The user input intent may be used by the non-lexical cue insertion engine 130 to determine the intent (e.g., an output intent), the insertion points, and/or the appropriate non-lexical cues.

The non-lexical cue insertion engine 130 may also insert one or more non-lexical cues into the original text to generate augmented text. In one embodiment, the non-lexical cue insertion engine 130 may add a tag to the original text, such as a tag of a markup language. The tag may be recognizable to the speech synthesizer to indicate which non-lexical cue should be included in the synthesized speech. In another embodiment, the non-lexical cue insertion engine 130 may simply add additional text to, and/or alter or change, the original text to generate augmented text. An embodiment of a non-lexical cue insertion engine is depicted in FIG. 2 and described below in greater detail with reference to the same.

The system 100, and particularly the dialogue system 120, may include a speech synthesizer 126. The speech synthesizer 126 can synthesize speech from the augmented text. The speech synthesizer 126 may include any appropriate speech synthesis technology configured to convert written text to artificial human speech. The speech synthesizer 126 may generate synthesized speech by concatenating pieces of recorded speech that are stored in the database 128. The speech synthesizer 126 may retrieve or otherwise access stored recordings of speech units—complete words and/or word parts, such as phones or diphones—stored in the database 128 and concatenate the recordings together to generate synthesized speech. The speech synthesizer 126 is configured to convert augmented text, including non-lexical cues, into synthesized speech. In other words, the speech synthesizer 126 is configured to recognize the inserted non-lexical cues and retrieve an appropriate speech unit to convert the non-lexical cue into output speech.

In one embodiment, the speech synthesizer 126 may be configured to recognize tags that have been added to generate the augmented text and/or parse the tags to determine a speech unit to retrieve to concatenate into output synthesized speech. The inserted tags may include markup language tags and may specify a non-lexical cue, its type (i.e., parasitic or word-like), and/or its location. In another embodiment, the speech synthesizer 126 may be configured to recognize and/or parse additional and/or altered text added to generate the augmented text to determine a speech unit to retrieve to concatenate into output synthesized speech.

Figure 2:
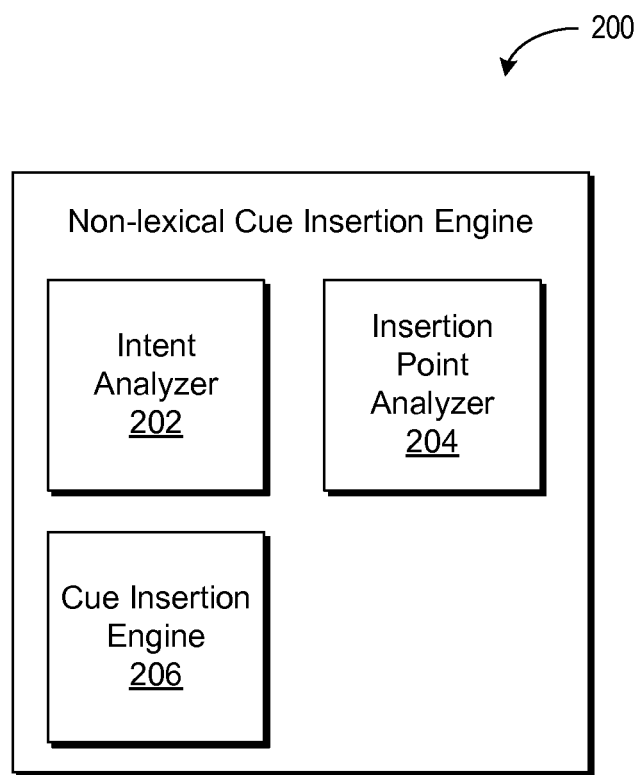
FIG. 2 is a schematic diagram of a non-lexical cue insertion engine of a system for providing non-lexical cues in text-to-speech output, according to one embodiment.

FIG. 2 is a schematic diagram of a non-lexical cue insertion engine 200 of a system for providing non-lexical cues in TTS output, according to one embodiment. The non-lexical cue insertion engine 200 of FIG. 2 may be included in a system such as system 100 of FIG. 1. The non-lexical cue insertion engine 200 of FIG. 2 includes an intent analyzer d, an insertion point analyzer 204, and a cue insertion engine 206.

The intent analyzer 202 may be configured to derive an intent of original text received by the non-lexical cue insertion engine 200. The intent analyzer 202 may analyze the original text to determine characteristics of the original text, or otherwise receive characteristics of the original text, and use the characteristics to derive an intent representative of intended meaning to be conveyed with the original text (e.g., meaning that may potentially be conveyed by non-lexical cues). These characteristics may include inherent characteristics, such as a general feeling of the text (e.g., happy, sad, concerned, relaxed, relieved positive, negative, etc.), a level of confidence in the accuracy of what is being conveyed by the text, and other inherent aspects of text. In some embodiments, the intent analyzer 202 may receive characteristics of the original text from, for example, an input analyzer 124 (FIG. 1) to derive an intent. In other embodiments, the intent analyzer 202 may receive an intent that may be representative of characteristics of the original text.

The intent analyzer 202 may derive the intent (or in some instances augment a received intent) from characteristics and/or features of the original text, past user action, a user profile, a device profile, or other sources of data from which patterns, probabilities (e.g., syntactic probability), and the like can be obtained and/or compared and/or contrasted. The intent may embody and/or represent one or more characteristics of the text.

The intent may indicate a category of the original text, such as sentence force (e.g., a statement, a command, a question), sarcasm, irony, emphasis, focus, politeness, uncertainty, feeling, ease of understanding, and the like.

As an example of deriving intent, the intent analyzer 202 may derive or otherwise ascertain a general feeling from the words included in the original text. A given word may have stored in connection with it in a database 128 a feeling indicator. For example, a word such as "excite," "fun," or "great" may be stored in the database with an associated indicator of a positive feeling. These same words may also be stored in association with other indicators, such as an indicator of a happy feeling, an indicator of an excited feeling, or the like. Multiple feeling indicators may be associated with a single word. The intent analyzer 202 may consider the one or more feeling indicators in deriving the intent.

The intent analyzer 202 may also derive or otherwise ascertain a level of confidence in the accuracy of what is being conveyed by the original text. A level of confidence may be derived from analyzing the combination of words and determining one or more probabilities (e.g., syntactic probabilities). Word probability may be determined using a probabilistic model. Sequences of two or more words may be analyzed and a probability of a given word in the sequence to appear in sequence with the other words may be determined. For example, in a sequence "this is a fluffy bowling ball," the word probability of "bowling" and "ball" appearing following "fluffy" may be relatively low. By contrast, in a sequence "this is a fluffy cat," the word probability of "cat" appearing following "fluffy" may be relatively high. The word probability can provide a level of confidence that can be used to derive an intent. Other probabilities may be determined to derive a level of confidence. Examples include syntactic pattern probability, linguistic pattern probability, word order probability, word group probability, sentence probability, and sentence sequence probability.

A level of confidence may also be derived from an external source. For example, an Internet search may be used to search terms in the original text. The search engine may produce a confidence level (e.g., in the quality of the search results) that can be used to derive an intent indicator. The search results of an Internet search may also be used to obtain a level of confidence. For example, the number of search results returned may provide a level of confidence. As another example, an indication provided by the search engine of a relative quality of one or more individual results can provide a level of confidence.

The intent analyzer 202 may consider past user interactions with a speaker of the original text and/or characteristics and/or features of the original text, including one or more of a general feeling of the original text and a level of confidence in the original text, to derive or augment an intent. If a previously derived intent is provided, or otherwise available, it may be considered and augmented (or revised) by the intent analyzer 202 in view of updated information. When a previous intent is not provided, or in other embodiments, the intent analyzer 202 may simply derive a new intent (or an initial intent).

The derived intent may be a word, a phrase, a sentence, etc. The intent may provide, indicate, or otherwise be representative of an intended meaning of the original text that may be conveyed with the original text (e.g., such as by non-lexical cues). In some instances, the intent may be similar to or even identical to the original text. In some instances, the intent may be represented as an intent code that may be representative of meaning that may be intended to be communicated, but that is not communicated by strictly the words in the original text. An intent code may be a number, a letter, a symbol, a word, a phrase, a sentence, etc. that is understood by the non-lexical cue insertion engine 200 as representing intent of the original text. The intent code may be representative of intended meaning derived from past user interactions of a speaker providing input to an NLI (e.g., a speech-to-text system of an NLI). For example, the intent code may be derived and/or augmented over time to recognize that short, terse original text may in fact be intended to provide a fuller, richer, more complete response.

The insertion point analyzer 204 may determine insertion points of non-lexical cues within the original text to generate augmented text. The intent derived by the intent analyzer 202 may be used by the non-lexical cue insertion engine 130 to determine the insertion points.

As an example, a syntactic probability in an intent code can be used to determine insertion points for non-lexical cues. In instances that a syntactic probability is low, a greater likelihood of uncertainty may be inherent and non-lexical cues can be added to output speech to convey additional meaning, such as uncertainty. By contrast, a higher syntactic probability may indicate higher confidence, greater assertiveness, or the like. The syntactic probability can be used to determine non-lexical cue insertion points that convey additional meanings of confidence, assertiveness, or the like.

As another example, a level of confidence in an intent code can be used in identifying insertion points for non-lexical cues. If the confidence level of a word sequence is low (e.g., "fluffy bowling ball"), the insertion point analyzer 204 may determine one or more insertion points where a non-lexical cue may be inserted to convey desired additional meaning, such as a low confidence. Accordingly, in a case where the original text includes the word sequence "this is a fluffy bowling ball," the insertion point analyzer 204 may determine that a non-lexical cue (e.g., such as a disfluency) could be inserted between "fluffy" and "bowling." As can be appreciated, a number of insertion points may be identified. The insertion point analyzer 204 may identify a set of possible non-lexical cue insertion points and may select a subset of those points based on or utilizing an intent code. As explained more fully below, the non-lexical cue insertion points may be between words or word parts or at particular words or word parts.

In other embodiments, the insertion point analyzer 204 may also determine which non-lexical cue(s) to insert into the original text at each selected non-lexical cue insertion point.

In the embodiment of FIG. 2, the cue insertion engine 206 may determine which non-lexical cue(s) to insert into the original text at each selected non-lexical cue insertion point identified by the insertion point analyzer 204. The cue insertion engine 206 may use the intent to determine an appropriate cue to insert at each selected non-lexical cue insertion point. The intent may be used to make the determination. The intent may enable the cue insertion engine 206 to identify word-like non-lexical cues to insert at non-lexical cue insertion points between words and/or word parts and to identify parasitic non-lexical cues to insert at non-lexical cue insertion points at (or on) words and/or word portions. The one or more non-lexical cues are selected according to the intent to augment the meaning conveyed by the words of the original text with additional intended meaning. For example, the original text "this is a fluffy bowling ball" may be augmented with one or more non-lexical cues, such as "this is a fluffy UM bowLING baLL." The disfluency "UM" and a rising intonation at the end of "bowling" and "ball" in the augmented text may convey uncertainty. The disfluency "UM" is a word-like non-lexical cue that may be selected to fill a pause. In this case, the disfluency "UM" may be selected for the insertion point between "fluffy" and "bowling" to convey additional meaning, namely uncertainty, about the word that follows "fluffy" in the text. Similarly, the rising intonations, namely the "LING" at the end of "bowling" and the "LL" at the end of "ball," are parasitic non-lexical cues that may be selected to augment word and/or word parts to convey questioning and/or uncertainty. In this case, these rising intonations are selected to convey additional meaning, namely questioning or uncertainty, about the words and/or word parts on which these non-lexical cues are parasitic.

The cue insertion engine 206 may also insert one or more non-lexical cues into the original text to generate augmented text. In one embodiment, the cue insertion engine 206 may add a tag to the original text, such as a tag of a markup language. The tag may be recognizable to the speech synthesizer to indicate which non-lexical cue should be included in the synthesized speech. In another embodiment, the cue insertion engine 206 may simply add additional text to, and/or alter or change, the original text. The cue insertion engine 206, and thus the non-lexical cue insertion engine 200, provides the augmented text to a speech synthesizer, as described above with reference to FIG. 1.

Figure 3:
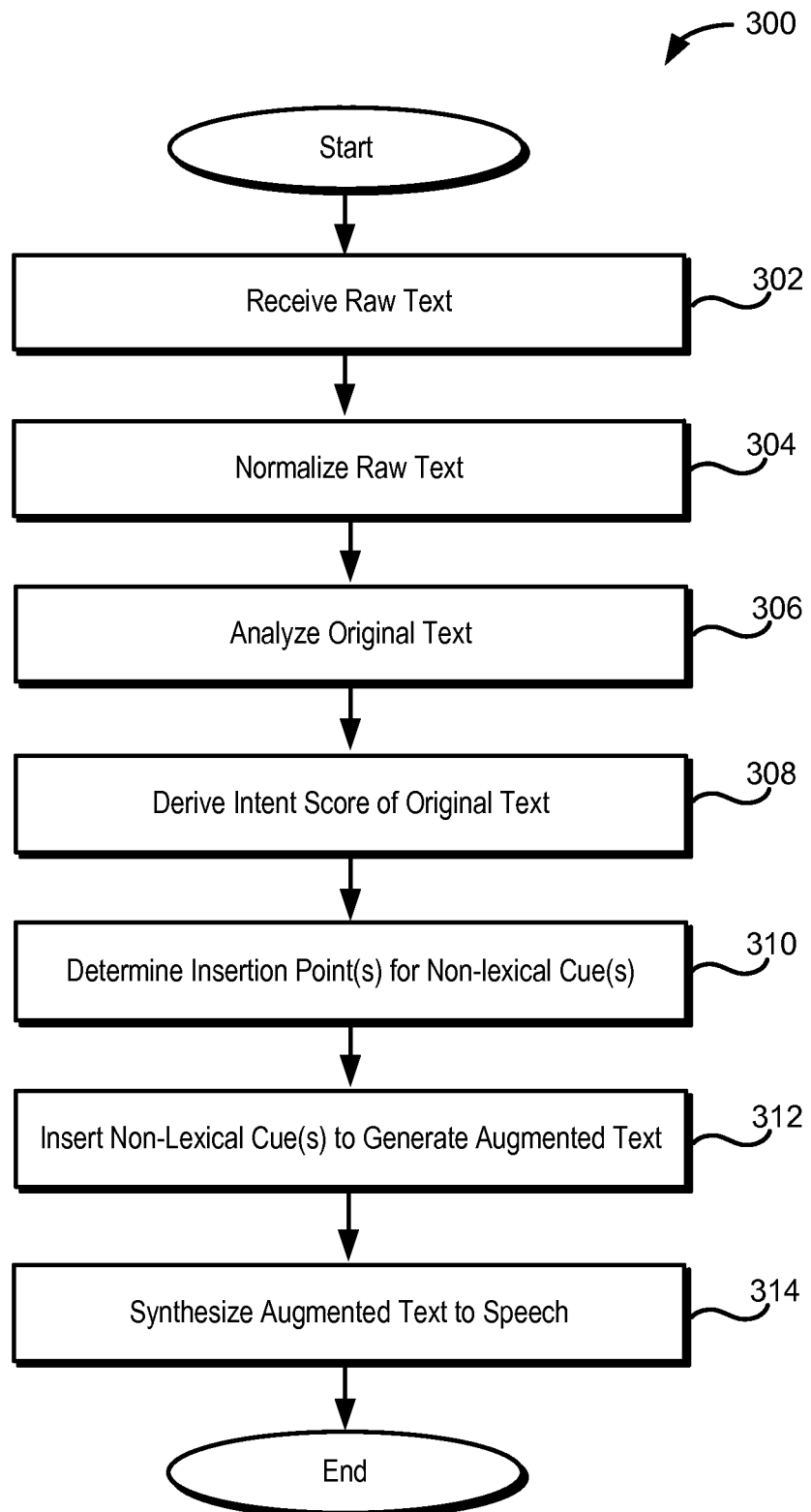
FIG. 3 is a flow diagram of a method for providing non-lexical cues in text-to-speech output, according to one embodiment.

FIG. 3 is a flow diagram of a method for providing non-lexical cues in TTS output, according to one embodiment. Raw text is received 302 and may be normalized 304 or otherwise pre-processed. The raw text or the normalized text (either of which may be considered original text) may be analyzed 306 to ascertain characteristics of the text. The analysis 306 may include consideration of additional context, such as historical patterns and previously received, augmented, and synthesized text. The characteristics may be used to derive 308 an intent for the original text. The intent may be an intent code that may be representative of intended meaning of the original text that may be intended to be communicated, but that is not communicated by strictly the words in the original text. The intent (e.g., intent code) may be derived 308 based at least partially on the characteristics. The characteristics may include a general feeling, a level of confidence, and other characteristics. The intent may also be derived based at least partially on a previous intent (or an earlier derived intent and/or intent code with respect to the same, similar, and/or different text).

Insertion points for non-lexical cues may be determined 310. The characteristics of the original text and/or the intent may aid in determination of the non-lexical cue insertion points. Non-lexical cues may be inserted 312 into the original text to generate augmented text. The non-lexical cues may be inserted 312 by an addition of text. In some embodiments, the non-lexical cues may be inserted 312 by inserting tags, such as tags of a mark-up language, that may be recognized and processed at the time of speech synthesis, such as by a speech synthesizer.

The augmented text may be synthesized 314 or converted to output synthesized speech. The augmented text may be synthesized 314 to speech using speech synthesizer technology. The speech synthesizer may retrieve recordings corresponding to words and/or word parts and concatenate the recordings together to produce synthesized speech. The recordings may be retrieved from a database. The database may include recordings corresponding to non-lexical cues, including word-like non-lexical cues and parasitic non-lexical cues. The synthesis 314 of the augmented text into speech includes recognizing inserted non-lexical cues and converting those cues to synthesized speech.

EXAMPLES

Example 1

A computer-implemented method of converting text to speech, the method comprising: analyzing, on one or more computing devices, original text to derive an intent representative of intended meaning of the original text that can be conveyed by non-lexical cues; determining, on the one or more computing devices, an insertion point of a non-lexical cue, in the original text, based on the derived intent; inserting by the one or more computing devices a non-lexical cue at the insertion point within the original text to generate augmented text; and synthesizing speech from the augmented text.

Example 2

The method of example 1, wherein deriving the intent comprises using a probabilistic model to determine a syntactic probability with respect to a sequence of words in the original text, wherein the intent includes the syntactic probability, and wherein the insertion point of the non-lexical cue is determined using the syntactic probability.

Example 3

The method of any of examples 1-2, wherein the syntactic probability includes one or more of probability of syntactic pattern, probability of linguistic pattern, word order probability, word group probability, sentence probability, and sentence sequence probability.

Example 4

The method of any of examples 1-3, wherein deriving the intent comprises determining a confidence level in the original text and the intent includes the confidence level, wherein the insertion point of the non-lexical cue is determined based on the confidence level.

Example 5

The method of example 4, wherein determining a confidence level comprises: performing a search of the Internet through a search engine using one or more words from the original text; and obtaining a confidence measure of the search engine for the search using the one or more words from the original text.

Example 6

The method of any of examples 1-5, wherein the non-lexical cue inserted at the insertion point is word-like because it is inserted in a manner that is distinct from already present lexical components of the original text.

Example 7

The method of any of examples 1-6, wherein the non-lexical cue inserted at the insertion point is parasitic on at least a portion of a word within the original text.

Example 8

The method of any of examples 1-7, wherein inserting the non-lexical cue at the insertion point comprises adding a tag of a markup language to the original text, wherein the tag is recognizable to the speech synthesizer to indicate the non-lexical cue to be included in the synthesized speech.

Example 9

The method of any of examples 1-8, wherein inserting the non-lexical cue at the insertion point comprises changing a portion of the original text.

Example 10

The method of any of examples 1-9, wherein the non-lexical cue is selected from among a group consisting of non-verbal disfluencies, phrasal stress, intonation, lengthening a word, breathing noises, and phonological gestures.

Example 11

The method of any of examples 1-10, wherein the original text is normalized raw text that has been pre-processed to convert symbols to written-out words.

Example 12

The method of any of examples 1-11, wherein deriving the intent comprises deriving an intent code that may be representative of intended meaning of the original text that may be intended to be communicated, but that is not communicated by strictly the words in the original text.

Example 13

The method of example 12, wherein the intent code comprises one or more of a number, a letter, a symbol, a word, a phrase, and a sentence.

Example 14

The method of any of examples 1-13, wherein the intent is distinct from and identical to the original text.

Example 15

The method of any of examples 1-14, wherein the intent is distinct from and similar to the original text.

Example 16

A system comprising means to implement the method of any one of examples 1-15.

Example 17

A system that converts text to speech, the system comprising: an intent analyzer to analyze original text received by the system to derive an intent representative of intended meaning to be conveyed by non-lexical cues; a non-lexical cue insertion engine to determine insertion points of non-lexical cues based on the derived intent and to insert a non-lexical cue at the insertion point within the original text to generate augmented text; and a speech synthesizer to synthesize speech from the augmented text.

Example 18

The system of example 17, wherein the intent analyzer derives the intent using a probabilistic model to determine syntactic probability in a sequence of words within the original text.

Example 19

The system of any of examples 17-18, wherein the intent analyzer derives the intent by determining a confidence level in the original text.

Example 20

The system of example 19, wherein determining a confidence level comprises performing a search of the Internet through a search engine using one or more words from the original text and obtaining a confidence measure of the search engine.

Example 21

The system of any of examples 17-20, wherein the non-lexical cue insertion engine inserts a non-lexical cue at the insertion point that is word-like because it is inserted in a manner that is distinct from already present lexical components of the original text.

Example 22

The system of any of examples 17-21, wherein the non-lexical cue insertion engine inserts a non-lexical cue at the insertion point that is parasitic on at least a portion of a word within the original text.

Example 23

The system of any of examples 17-22, wherein the non-lexical cue insertion engine inserts the non-lexical cue at the insertion point by adding a tag of a markup language to the original text, wherein the tag is recognizable to the speech synthesizer to indicate the non-lexical cue to be included in the synthesized speech.

Example 24

The system of any of examples 17-23, wherein the non-lexical cue insertion engine inserts the non-lexical cue at the insertion point by changing a portion of the original text.

Example 25

The system of example 17-24, further comprising a database of recorded audio pieces the speech synthesizer can use and concatenate together to synthesize speech, wherein the database of recorded audio pieces includes audio pieces of non-lexical cues.

Example 26

The system of example 25, wherein the audio pieces of non-lexical cues in the database include at least one audio piece of a parasitic lexical cue that is a varied form of another audio piece in the database, wherein the varied from comprises one or more of a phrasal stress, an intonation, or a lengthening of at least a portion of the another audio piece.

Example 27

The system of example 25, wherein the audio pieces of non-lexical cues in the database include at least one audio piece that includes one of the group consisting of: a non-verbal disfluency; a breathing noise; and a phonological gesture.

Example 28

The system of any of examples 17-27, further comprising a text normalizer to perform text normalization on raw text received by the system to generate the original text that is normalized text, wherein text normalization includes converting symbols in the raw text to written-out words in the original text.

Example 29

The system of any of examples 17-28, wherein the intent analyzer derives the intent by deriving an intent code that may be representative of intended meaning of the original text that may be intended to be communicated, but that is not communicated by strictly the words in the original text.

Example 30

The system of example 29, wherein the intent code comprises one or more of a number, a letter, a symbol, a word, a phrase, and a sentence.

Example 31

The system of any of examples 17-30, wherein the intent is distinct from and identical to the original text.

Example 32

The system of any of examples 17-31, wherein the intent is distinct from and similar to the original text.

Example 33

A computer-readable storage medium having stored thereon instructions that, when executed by a processor, cause the processor to perform operations comprising: analyzing original text to derive an intent representative of intended meaning to be conveyed by one or more non-lexical cues; determining an insertion point of a non-lexical cue based on the derived intent; inserting a non-lexical cue at the insertion point within the original text to generate augmented text; and synthesizing speech from the augmented text.

Example 34

The computer-readable storage medium of example 33, wherein deriving an intent comprises using a probabilistic model to determine a syntactic probability with respect to a sequence of words in the original text, wherein the intent includes the syntactic probability, and wherein the insertion point of the non-lexical cue is determined using the syntactic probability.

Example 35

The computer-readable storage medium of any of examples 33-34, wherein the syntactic probability includes one or more of syntactic pattern, probability of linguistic pattern, word order probability, word group probability, sentence probability, and sentence sequence probability.

Example 36

The computer-readable storage medium of any of examples 33-35, wherein deriving an intent comprises determining a confidence level in the original text, wherein the intent includes the confidence level.

Example 37

The computer-readable storage medium of example 36, wherein determining a confidence level comprises: performing a search of the Internet through a search engine using one or more words from the original text; and obtaining a confidence measure of the search engine for the search using the one or more words from the original text.

Example 38

The computer-readable storage medium of any of examples 33-37, wherein the non-lexical cue inserted at the insertion point is word-like because it is inserted in a manner that is distinct from already present lexical components of the original text.

Example 39

The computer-readable storage medium of any of examples 33-38, wherein the non-lexical cue inserted at the insertion point is parasitic on at least a portion of a word within the original text.

Example 40

The computer-readable storage medium of any of examples 33-39, wherein inserting the non-lexical cue at the insertion point comprises adding a tag of a markup language to the original text, wherein the tag is recognizable to the speech synthesizer to indicate the non-lexical cue to be included in the synthesized speech.

Example 41

The computer-readable storage medium of any of examples 33-40, wherein inserting the non-lexical cue at the insertion point comprises changing a portion of the original text.

Example 42

The computer-readable storage medium of any of examples 33-41, wherein the non-lexical cue is selected from among a group consisting of non-verbal disfluencies, phrasal stress, intonation, lengthening a word, breathing noises, and phonological gestures.

Example 43

The computer-readable storage medium of any of examples 33-42, wherein deriving the intent comprises deriving an intent code that may be representative of intended meaning of the original text that may be intended to be communicated, but that is not communicated by strictly the words in the original text.

Example 44

The computer-readable storage medium of example 43, wherein the intent code comprises one or more of a number, a letter, a symbol, a word, a phrase, and a sentence.

Example 45

The computer-readable storage medium of any of examples 33-44, wherein the intent is distinct from and identical to the original text.

Example 46

The computer-readable storage medium of any of examples 33-45, wherein the intent is distinct from and similar to the original text.

Example 47

A system that converts text to speech, the system comprising: means for analyzing original text received by the system to derive an intent representative of intended meaning to be conveyed by non-lexical cues; means for determining insertion points of non-lexical cues based on the derived intent and to insert a non-lexical cue at the insertion point within the original text to generate augmented text; and means for synthesizing speech from the augmented text.

Example 48

The system of example 47, wherein the analyzing means derives the intent using a probabilistic model to determine syntactic probability in a sequence of words within the original text.

The above description provides numerous specific details for a thorough understanding of the embodiments described herein. However, those of skill in the art will recognize that one or more of the specific details may be omitted, or other methods, components, or materials may be used. In some cases, well-known features, structures, or operations are not shown or described in detail.

Furthermore, the described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that perform one or more tasks or implement particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be obvious to those having skill in the art that many changes may be made to the details of the above-described embodiments without departing from the underlying principles of the invention. The scope of the present invention should, therefore, be determined only by the following claims.

The invention claimed is:

1. A system to generate a response to a user input, the system comprising:
   one or more storage devices including instructions;
   processor circuitry to execute the instructions to:
      determine a user tone of the user input;
      generate a response to the user input based on the user tone; and
      identify a response tone associated with the user tone; and
   a transmitter to communicate the response and the response tone over a network.

2. The system of claim 1, wherein the response is text.

3. The system of claim 1, wherein the user input is an audio signal.

4. The system of claim 1, wherein the user tone is polite.

5. The system of claim 1, wherein the user tone is a feeling.

6. The system of claim 1, wherein the processor is to select the response from a plurality of candidate responses.

7. At least one storage device comprising computer readable instructions that, when executed, cause at least one machine to at least:
   determine a user tone of a user input;
   generate a response to the user input based on the user tone;
   identify a response tone associated with the user tone; and
   communicate the response and the response tone over a network.

8. The at least one storage device of claim 7, wherein the response is text.

9. The at least one storage device of claim 7, wherein the user input is an audio signal.

10. The at least one storage device of claim 7, wherein the response tone is polite.

11. The at least one storage device of claim 7, wherein the response tone is a feeling.

12. The at least one storage device of claim 7, wherein the instructions cause the at least one machine to select the response from a plurality of candidate responses.

13. A system to cause a computing device to communicate with natural language, the system comprising:
   means for determining a user tone of the user input;
   means for generating a response to the user input, the generating means to:
      generate a response to the user input based on the user tone; and
      identify a response tone associated with the user tone, the response tone to add a natural language sound to the response; and
   means for communicating the response and the response tone over a network for presentation by the computing device.

14. The system of claim 13, wherein the response is text.

15. The system of claim 13, wherein the user input is an audio signal.

16. The system of claim 13, wherein at least one of the user tone or the response tone is polite.

17. The system of claim 13, wherein at least one of the user tone or the response tone is a feeling.

18. The system of claim 13, wherein the generating means is to select the response from a plurality of candidate responses.

\* \* \* \* \*